US00RE36997E

United States Patent [19]

Kensrue

[11] E Patent Number: Re. 36,997

[45] Reissued Date of Patent: Dec. 26, 2000

[54] ARC WELDING TORCH

[75] Inventor: Milo M. Kensrue, Newport Beach, Calif.

[73] Assignee: M.K. Products, Inc., Irvine, Calif.

[21] Appl. No.: 09/336,118

[22] Filed: Jun. 17, 1999

Related U.S. Patent Documents

Reissue of:

[64] Patent No.: 5,728,995
Issued: Mar. 17, 1998
Appl. No.: 08/655,252
Filed: Jun. 3, 1996

[51] Int. Cl.[7] ..... B23K 9/173

[52] U.S. Cl. ..... 219/137.31; 219/137.51

[58] Field of Search ..... 219/137.61, 136, 219/137.44, 137.51, 137.7

[56] References Cited

U.S. PATENT DOCUMENTS

| | | | |
|---|---|---|---|
| 3,433,925 | 3/1969 | Benfield | 219/137.7 |
| 3,689,733 | 9/1972 | Matasovic | 219/136 |
| 3,783,233 | 1/1974 | Molin | 219/136 |
| 4,727,238 | 2/1988 | Mann | 219/137.31 |
| 5,260,546 | 11/1993 | Ingwersen et al. | 219/137.31 |
| 5,338,917 | 8/1994 | Stuart et al. | 219/137.51 |
| 5,491,321 | 2/1996 | Stuart et al. | 219/137.61 |

*Primary Examiner*—Clifford C. Shaw
*Attorney, Agent, or Firm*—Harold L. Jackson

[57] ABSTRACT

An arc welding torch includes a current conducting mounting block which provided with an open-ended socket for receiving the mounting end of a current conducting removable and rotatable barrel having a welding tip at the free end thereof. Welding wire, inert gas and coolant are supplied to the welding tip via passageways in the block and barrel. A current carrying split collar is slidable along the barrel and adapted to be wedged between the barrel and the inner surface of the socket adjacent the open end thereof via a nut which engages threads on the block to maintain the barrel in a seated and fixed position in the socket.

24 Claims, 2 Drawing Sheets

ARC WELDING TORCH

Matter enclosed in heavy brackets [ ] appears in the original patent but forms no part of this reissue specification; matter printed in italics indicates the additions made by reissue.

FIELD OF THE INVENTION

The present invention relates to arc welding torches and particularly to welding torches of the Gas Metal Arc Welding ("GMAW") type in which the barrel carrying the welding tip can be readily removed or rotated to any desired angular position.

BACKGROUND OF THE INVENTION

GMAW welding torches typically comprise a mounting block adapted to be manipulated by a welder's hand or a robotic manipulator, made of current conducting material such as aluminum or a copper alloy. A current conducting barrel, having a welding tip at the remote end thereof, is generally inserted into a socket formed in the block. The barrel is secured in the block by means of bolts which squeeze two sides of the block, separated by a slit, together adjacent the entrance to the socket. The mounting block transfers a consumable electrode or welding wire, weld current, inert gas and generally a coolant fluid such as water, from a stationary location, e.g., a cabinet, to the barrel. The barrel is provided with appropriate passageways or channels for conducting such materials to the welding tip. See U.S. Pat. No. 4,954,690 which describes the GMAW torch sold by the assignee of this application, M. K. Products, Inc., under the trademark Prince®. The Prince® torch does not provide a coolant liquid to the barrel. Also see U.S. Pat. No. 5,549,068 which describes another torch marketed by M. K. Products under the trademark King Cobra®. The latter torch, which is water cooled, utilizes intermediate barrel mounted to the block for holding the torch barrel.

Torch barrels may be straight or curved depending upon the type of welding to be accomplished and the preferences of the welder. It is often necessary or highly desirable for an operator to be able to change the angular position of a curved barrel relative to the block to accommodate a robotic manipulator or to configure the torch so that it is more ergonomically compatible to a welder's hand manipulations.

The barrels in both of the above prior art torches can be rotated. However, a proper tool is used to remove the cover and adjust the angular position of the '690 torch. An angular adjustment of the barrel in the '068 torch can be readily accomplished by hand. However, the intermediate barrel (referred to in the '068 patent as the main barrel) constitutes not only an additional element, but an element that is expensive to manufacture in view of the bayonet connections (22*a* and 22*b,* FIG. 3) for the cooling water. In addition, arcing can occur between metallic collet fingers (100, FIG. 5) and the welding tip barrel mounting structure (34, FIG. 3) of the '068 torch if the operator fails to insure that the collet nut 20 is rotated to its tightened stop position.

There is a need for an improved GMAW torch assembly which allows an operator to readily rotate a weld tip barrel (particularly of the curved type) without disturbing the feed wire, gas and coolant connections while insuring that a reliable current carrying connection between the barrel and block is maintained after the rotation has been accomplished.

SUMMARY OF THE INVENTION

A welding torch, in accordance with the present invention, includes a mounting block assembly of current conducting material, such as aluminum or a copper alloy, having a cylindrical open-ended receiving socket with a proximal end adjacent the opening and a distal interior section. The mounting block is adapted to be connected to a welding current source and includes passageways opening into the distal section of the socket for supplying welding wire, coolant and inert gas to passageways in the mounting end of a current conducting elongated torch barrel *structure* inserted into the socket. [A] *The barrel structure having a frusto-conically shaped seating portion, such as a* current carrying split collar *which* is slidable along the outer surface of the torch barrel for insertion into and extraction from a seated position in the proximal end of the socket. Preferably the collar is carried by the torch barrel. The collar, in its seated position, is wedged between the inner surface of the proximal end of the socket and the outer surface of the barrel to carry welding current therebetween and to maintain the barrel in a fixed position relative to the block. The collar, in its unseated position, permits the torch barrel to be rotated without disturbing the wire, gas and coolant connections or removed entirely from the mounting block. A manually operable assembly, such as a nut and a cooperating threaded portion on the block allows an operator to move the collar along the barrel to its seated or unseated position.

The construction and features of the torch assembly of the present invention may best be understood by reference to the following description taken in conjunction with the appended drawings.

DESCRIPTION OF THE PREFERRED EMBODIMENT

Figure 1:
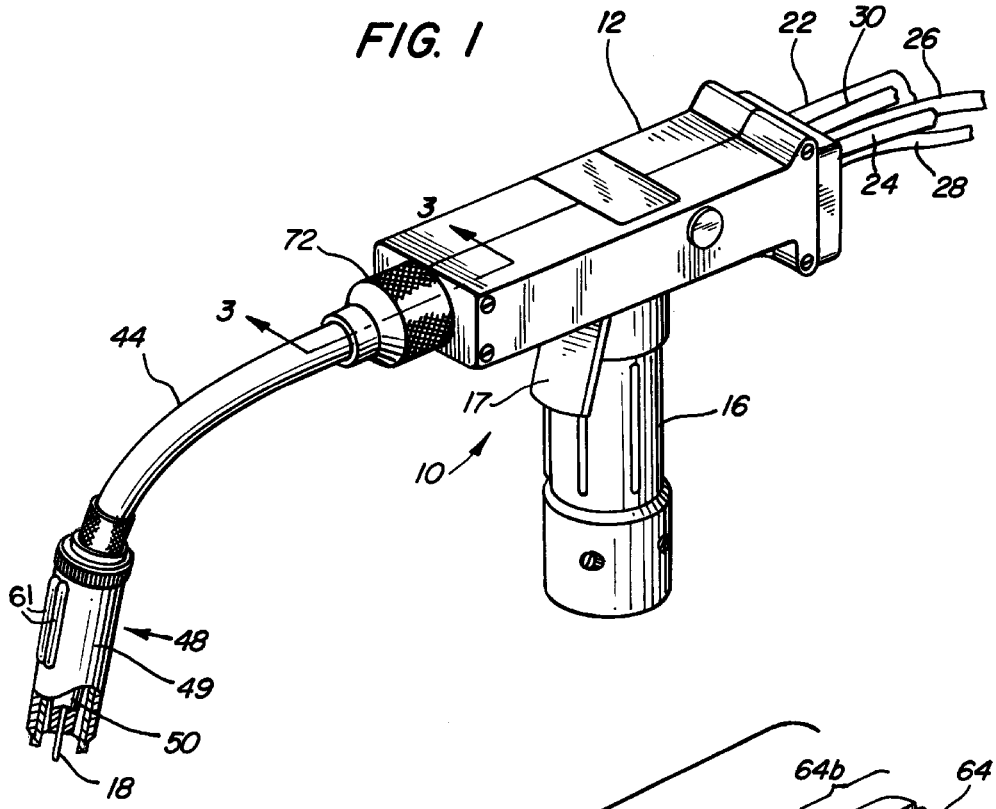
FIG. 1 is a perspective view, partially broken away, of the mounting block assembly and torch barrel of the present invention.

Referring now to the drawings, a GMAW welding torch or gun is illustrated (FIG. 1) which can be manually manipulated or mounted on a robotic manipulator. The gun includes an insulated housing 10, the upper portion 12 of which encloses a current conducting mounting block 14 (shown in FIG. 3). The housing includes a lower portion which forms a pistol grip for accommodating an operator's hand and encloses an electric motor (not shown). The motor pulls a consumable wire electrode 18 via a gear drive 20 (FIG. 4), from a spool of wire carried by the gun or from a stationary location, such as a cabinet (not shown), containing a spool of welding wire and supplies of welding current, inert gas and coolant fluid. A hand operated lever 17 conventionally controls a potentiometer/switch arrangement (not shown) to operate and control the speed of the motor. Coolant fluid, generally water, is supplied to the mounting block through the power cable sheath 22 and returned to the cabinet (or a sink) through a conduit or hose, such as 24. Inert gas is supplied to the block 14 through a conduit or hose, such as 26. Power for the wire pull motor may be supplied through a cable, such as 28. The conduit 30 houses the weld wire 18.

The mounting block 14, along with a forwardly extending frusto-conical-barrel-mounting sleeve or collet 34, having an integral flange 34*a,* is bolted to the block 14 via bolts 34*b.* The block 14 and sleeve 34 form a mounting block assembly. Both the block 14 and the sleeve are manufactured from a current conducting material with the block generally made of aluminum and the sleeve being made of a brass or copper alloy. The block assembly is provided with a cylindrical open-ended receiving socket which includes a distal section, indicated generally by the bracket 36 in FIG. 3, and a proximal end formed by the interior of the sleeve 34. It is to be noted that while the sleeve is illustrated as a separate piece, it may be formed integrally with the block 14. The block 14 is formed with annular channels 38, 40 and 42 and passageways 38*a,* 40*a* and 42*a* for providing coolant fluid and inert gas to the torch barrel as will be more fully described.

The barrel structure includes a curved cylindrical barrel member 44 (FIG. 1) made of a suitable current conducting material such as a copper alloy, which carries a welding tip 48 at the other end. The welding tip is conventional and includes a shroud 49 surrounding a wire guide 50 through which the consumable electrode is fed to the welding site. The shroud 49 is cooled by coolant channeled through the barrel and is insulated from the current conducting barrel to eliminate arcing between the shroud and the work piece. The barrel may also be covered by an insulating sheath. Inert gas from the mounting block flows through a separate passageway in the barrel (not shown) and exits in the space between the wire guide 50 and the shroud 49. It should be noted that the barrel member may be straight instead of curved, in which case there is no need to rotate the barrel after installation.

Figure 3:
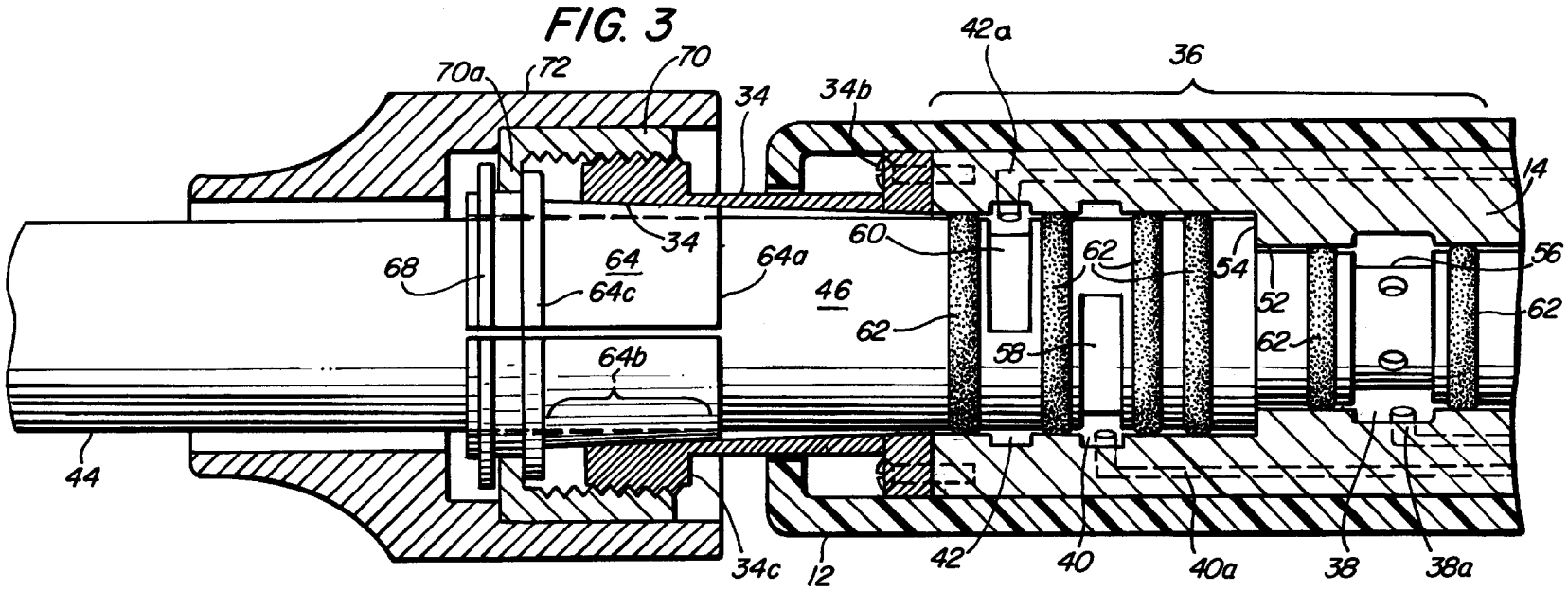
FIG. 3 is a cross-sectional view of the mounting end of the torch barrel seated in the receiving socket of the mounting block assembly.
Figure 4:
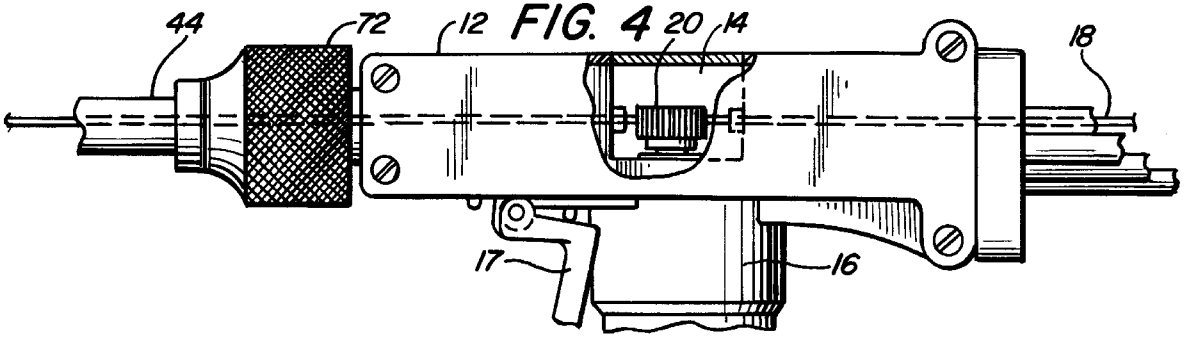
FIG. 4 is a side elevational view, partially broken away, of the mounting block assembly with the mounting end of the torch barrel seated therein.

The mounting end 46 of the barrel is arranged to be axially inserted into the receiving socket of the mounting block assembly as is illustrated in FIG. 3. The distal section of the receiving socket is provided with an inwardly projecting abutment 52 which registers with a shoulder 54 when the mounting end of the barrel is in seated and registered position in the socket. The mounting end of the barrel is provided with peripheral grooves 56, 58 and 60 which are aligned with the socket channels 38, 40 and 42, respectively, when the barrel is seated within the socket.

A passageway, within the barrel (not shown) conducts the inert gas from the channel 56 to the welding tip. Additional passageways within the barrel (not shown) conduct coolant fluid from one of the channels 58, 60 to the shroud and back to the other channel in a conventional manner. The coolant, e.g., water, circulates to the very front of the shroud or cup 49 and circulates around the shroud to cool the same and then returns back to the barrel passageways. Protrusions 61 in the shroud conduct the coolant to and from the barrel. O rings 62 extend between retaining recesses in the mounting end of the barrel and the socket wall to maintain the several fluids within their assigned channels.

Figure 2:
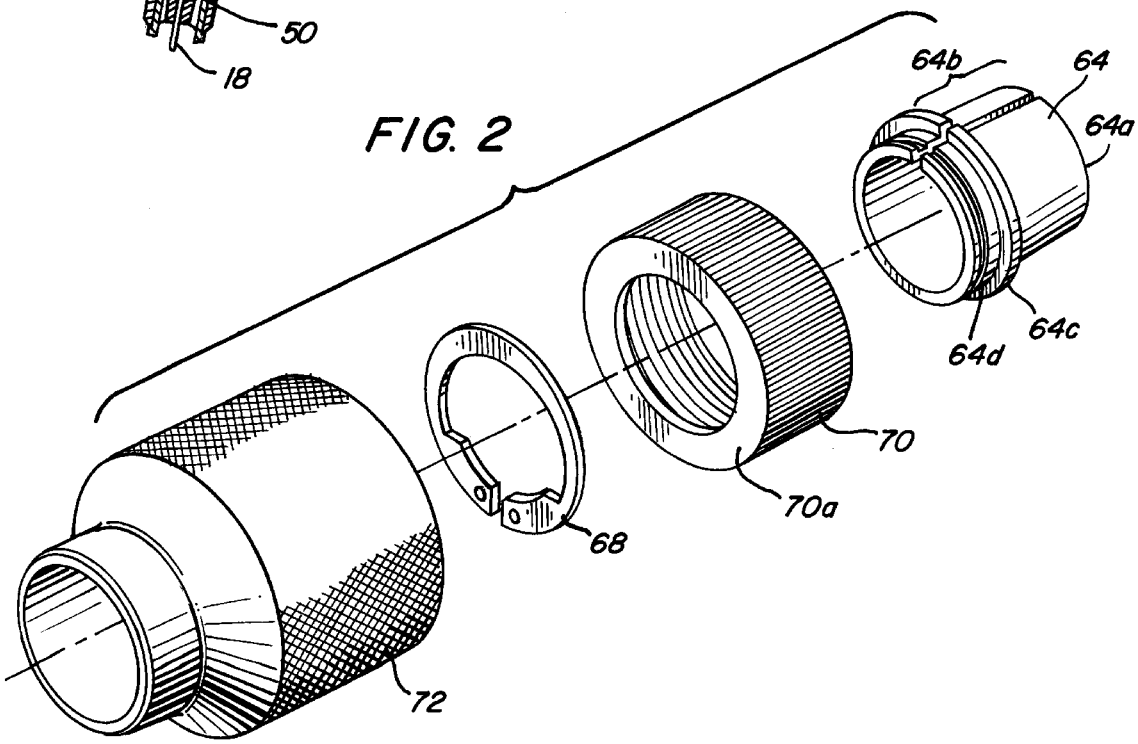
FIG. 2 is an enlarged exploded view of a split collar and an insertion/extraction nut subassembly for securing the barrel to the mounting block.

A current conducting split collar 64[,] *forming part of the barrel structure and* made for example of a brass or copper alloy, cooperates with the mounting block sleeve or collet 34 to secure the mounting end of the barrel in the block assembly socket and prevent relative movement therebetween. The collar 64 has a substantially cylindrical inner surface and an outer surface which tapers at a small angle within the range of about 1° to 5° and preferably about 2° toward the insertion end 64*b* as is illustrated in FIG. 3. The taper, designated by the bracket 64*b* in FIGS. 2 and 3[,] *forms a frusto-conical shaped seating surface which* mates with a corresponding *frusto-conical* taper on the inner surface 34*d* of the sleeve 34. The cylindrical inner surface of the collar is arranged to slide axially along the outer surface of the mounting end 46 of the torch barrel 44. The collar 64 is arranged to be carried by the barrel *and forms a portion of the barrel structure*, although it could be carried and remain a part of the mounting block assembly.

The collar 64 is provided with an outwardly projecting flange 64*c* and a snap ring receiving groove 64*d* into which a snap ring 68 is arranged to be seated. A collar-insertion/extraction nut 70 cooperates with the externally threaded forward end 34*c* of the sleeve 34 to insert and extract the split collar from a seated position in the sleeve as will be explained more fully.

The insertion/extraction nut 70 includes an inwardly projecting shoulder 70*a* which is captured between the flange 64*c* and the snap ring 68. A knurled cap 72 made of insulating material is press fitted over the nut 70.

The torch is assembled by inserting the mounting end of the torch barrel, with the insertion/extraction nut 70 (including cap 72) and collar 64 positioned thereon, into the receiving socket of the block assembly until the shoulder 54 engages the socket abutment 52. The collar 64 and nut 70 are then slid along the barrel until the nut engages the threads on the sleeve 34. When the barrel has been turned, to provide the desired angular relationship between the mounting block assembly and the weld site or workpiece, the nut 70 is driven along the threads on the sleeve until the barrel is firmly secured in the block assembly. In the secured or seated position, the collar is wedged between the outer surface of the barrel and the inner surface of the sleeve 34 to prevent relative movement between the barrel and block assembly and to provide a continuous and reliable path for the welding current. When the rotational direction of the nut 70 is reversed the shoulder of the nut engages the snap ring and pulls the collar forwardly of the sleeve 34. This action unseats the collar and allows the barrel to be rotated relative to the block assembly without disturbing the gas, wire and coolant connections since the mounting end of the barrel remains seated in the distal end of the socket. When the collar is unseated the mounting end of the barrel may also be manually removed from the block assembly.

There has thus been described a novel GMAW type welding torch which allows an operator or welder to rotate the torch barrel to a desired angular position without disturbing the fluid and wire connections while insuring that a reliable current path to the barrel is maintained after the rotation has been completed. Various modifications and improvements will become obvious to those skilled in the art without involving any departure from the spirit and scope of the invention as covered by the appended claims.

What is claimed is:

1. A welding torch apparatus comprising:

a) a mounting block assembly of current conducting material having a cylindrical open-ended receiving socket portion terminating at the front end thereof in a collet, the mounting block assembly being provided with passageways opening into the socket portion which are connectable with gas, water, and welding wire sources, the mounting block assembly being connected to a welding current source;

b) an elongated torch barrel of current conducting material mounting a welding tip at one end thereof and being provided at its other end with a mounting end adapted for endwise axial insertion into a seated position in said socket to establish operative connections with the gas, water and welding wire sources;

c) a current conducting cone-shaped collar carried by and slidable along the torch barrel adjacent the mounting end thereof for insertion into a seated position in the collet and for extraction from the collet to an unseated position, the collar carrying current to the barrel and preventing relative movement between the barrel and the mounting block assembly when in a seated position and for allowing relative movement between the barrel and the mounting block assembly when in an unseated position; and d) manually operable means for seating and unseating the collar in the collet.

2. The welding torch apparatus of claim 1 wherein the manually operable means includes an externally threaded portion on the collet and a nut rotatable on the barrel and coupled to the collar, the nut having internal threads for engaging the threaded portion of the collet.

3. The welding torch apparatus of claim 2 wherein the coupling between the nut and the collar causes the collar to be inserted into its seated position in the collet when the nut is turned in one direction and causes the collar to be unseated when the nut is turned in the other direction.

4. The welding torch apparatus of claim 3 wherein the collar is split.

5. The welding torch apparatus of claim 4 wherein the coupling between the collar and nut comprises a pair of spaced rings carried by the collar and an inwardly depending flange on the nut disposed between the rings.

6. A welding torch apparatus comprising:

a) a mounting block assembly of current conducting material having a cylindrical-open-ended-receiving socket therein, the socket having a proximal end adjacent the opening and a distal interior section, the block being connected to a source of welding current and having passageways opening into the distal section of the socket which are connectable with gas[, water] and welding wire sources;

b) an elongated torch barrel of current conducting material mounting a welding tip at one end thereof and being provided at its other end with a mounting end adapted for axial insertion into a seated position in the socket of the mounting block to establish operative connections with the gas[, water] and welding wire sources; and c) a current conducting split collar slidable along the outer surface of the torch barrel mounting end for insertion into and extraction from a seated position in the proximal end of the socket, the collar in its seated position engaging the outer surface of the barrel and the inner surface of the proximal end of the socket for carrying current between the mounting block and barrel and preventing relative movement between the barrel and the mounting block and in its unseated position allowing relative movement between the barrel and mounting block whereby the barrel can be rotated relative to the mounting block or removed therefrom.

7. The torch apparatus of claim 6 wherein one of the engaging surfaces of the collar and the socket proximal end is tapered.

8. The torch apparatus of claim 7 wherein the engaging surface of the collar is tapered.

9. The torch apparatus of claim 8 wherein the engaging surface of the proximal end of the socket is also tapered.

10. The torch apparatus of claim 7 further including manually operable means carried by the mounting block assembly or the barrel for selectively seating and unseating the collar with respect to the proximal end of the mounting block socket.

11. The torch apparatus of claim 10 wherein the proximal end of the socket includes a collet and wherein the manually operable means includes an externally threaded portion of collet and a nut coupled to the collar with internal threads for engaging the threads on the collet.

12. The torch apparatus of claim 11 wherein the nut seats the collar in the collet when turned in one direction and unseats the collar when turned in the opposite direction.

13. The torch apparatus of claim 12 wherein the collar has externally tapered surface which matches the internal taper of the collet.

*14. A welding torch apparatus comprising:*

*a) a mounting block assembly of current conducting material having a cylindrical open-ended receiving socket portion terminating at the front end thereof in a collet, the collet having an inner frusto-conical seating surface which tapers outwardly and a threaded portion at the forward end thereof, the mounting block assembly being provided with passageways opening into the socket portion which are connectable with gas and welding wire sources, the mounting block assembly being connected to a welding current source;*

*b) a torch barrel structure including an elongated torch barrel of current conducting material mounting a welding tip at one end thereof and being provided at its other end with a mounting end adapted for endwise axial insertion into a seated position in said socket to establish operative connections with the current, gas and welding wire sources;*

*c) the torch barrel structure having an outwardly projecting flange at the mounting end and a frusto-conically shaped seating portion extending rearwardly of the flange for insertion into a seated position in the frusto conical seating surface of the collet and for extraction from the collet to an unseated position; and*

*d) a nut carried by the torch barrel adjacent the mounting end thereof, the nut having threads for engaging the threaded portion of the collet and an inwardly extending portion for engaging the flange on the torch barrel to seat and secure the torch barrel structure within the collet and prevent relative movement between the barrel and the mounting block assembly when the nut is tightened on the threaded portion of the collet and to allow the torch barrel to be rotated relative to the mounting block assembly when the nut is loosened from the threaded portion.*

*15. The welding torch of claim 14 wherein the threaded portion of the collet comprises external threads, the threads on the nut comprise internal threads and the nut is slidably mounted on the torch barrel.*

*16. The welding torch of claim 14 wherein the outwardly projecting flange and frusto-conically shaped seating portion comprises a current conducting cone-shaped collar carried by and slidable along the torch barrel adjacent the mounting end thereof for insertion into a seated position in the collet and for extraction from the collet to an unseated position, the collar carrying current to the barrel and preventing relative movement between the barrel and the mounting block assembly when in a seated position and for allowing relative movement between the barrel and the mounting block assembly when in an unseated position.*

*17. The welding torch apparatus of claim 16 wherein the nut is coupled to the collar and causes the collar to be inserted into its seated position in the collet when the nut is turned in one direction and causes the collar to be unseated when the nut is turned in the other direction.*

*18. The welding torch apparatus of claim 17 wherein the collar is split.*

*19. The welding torch apparatus of claim 18 wherein the coupling between the collar and nut comprises a pair of spaced rings carried by the collar and an inwardly depending flange on the nut disposed between the rings.*

*20. A welding torch apparatus comprising:*

*a mounting block assembly of current conducting material having a cylindrical-open-ended-receiving socket therein at the distal end, a frusto-conical proximal end adjacent the opening, and a threaded portion adjacent the opening, the mounting block being connected to a source of welding current and having passageways opening into the distal section of the socket which are connectable with gas and welding wire sources;*

*an elongated torch barrel of current conducting material mounting a welding tip at one end thereof and being provided at its other end with a mounting end adapted for axial insertion into a seated position in the socket of the mounting block to establish operative connections with the gas and welding wire sources, the elongated torch barrel having an outwardly projecting flange and a tapered outer surface portion extending rearwardly of the flange at the torch barrel mounting end, the torch barrel carrying a slidable nut having threads adapted to cooperate with the threads on the mounting block and an inwardly extending shoulder for engaging the flange to insert the tapered outer surface portion into a seated position in the frusto-conical proximal end of the socket when the nut is tightened on the threaded portion of the mounting block, the tapered portion in its seated position engaging the inner surface of the proximal end of the socket for carrying current between the mounting block and barrel and preventing relative movement between the barrel and the mounting block, the torch barrel being arranged to be moved relative to the mounting block when the nut is loosened from the threaded portion of the mounting block whereby the barrel can be rotated relative to the mounting block, the torch barrel being arranged to be removed from the mounting block when the nut is removed from the threaded portion of the mounting block.*

*21. The torch apparatus of claim 20 wherein the threads on the mounting block and torch barrel are external and internal, respectively.*

*22. The torch apparatus of claim 21 wherein the engaging surface of the torch barrel is tapered at an angle within a range of about 1 to 5 degrees.*

*23. The torch apparatus of claim 21 wherein the outwardly projecting flange and the tapered outer surface portion of the torch barrel comprise a cone shaped collar, the frusto-conical end of the socket is in the form of a collet and the collar has externally tapered surface which matches the internal taper of the collet.*

*24. The torch apparatus of claim 21 wherein the tapered portion of the torch barrel is a current conducting split collar slidable along the outer surface of the torch barrel for insertion into the frusto-conical end of the socket.*

* * * * *